(12) United States Patent
Aiso

(10) Patent No.: US 6,903,866 B2
(45) Date of Patent: *Jun. 7, 2005

(54) OPTICAL FIBER FOR OPTICAL AMPLIFIER

(75) Inventor: Keiichi Aiso, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/320,540

(22) Filed: Dec. 17, 2002

(65) Prior Publication Data

US 2003/0128421 A1 Jul. 10, 2003

(30) Foreign Application Priority Data

Dec. 18, 2001 (JP) ........................................ 2001-384745
Feb. 19, 2002 (JP) ........................................ 2002-041922

(51) Int. Cl.$^7$ ................................................. H01S 3/00
(52) U.S. Cl. ................................................. 359/341.1
(58) Field of Search ...................................... 359/341.1

(56) References Cited

U.S. PATENT DOCUMENTS

| 6,317,549 | B1 | * | 11/2001 | Brown ........................ 385/123 |
| 6,538,806 | B2 | * | 3/2003 | Endo et al. ............... 359/341.5 |
| 6,556,757 | B2 | * | 4/2003 | Ellison et al. .............. 385/127 |
| 2003/0169483 | A1 | * | 9/2003 | Arbore ..................... 359/341.1 |

OTHER PUBLICATIONS

K. P. Hansen et al., "Design Optimisation of Erbium–Doped Fibres for use in L–Band Amplifiers," Electronics Letters, 2000, vol. 36, pp. 1685–1686.

Y. Tashiro et al., "1.5 W Erbium Doped Fiber Amplifier Pumped by the Wavelength Division–Multiplexed 1480 nm Laser Diodes with Fiber Bragg Grating," Technical Digest, Optics Amplifiers and their Applications, 1998, WC–2, pp. 18–20.

S. Radic et al., "Signal Impairment due to Four–Wave Mixing in L–Band EDFAs," European Conference on Optical Communication, 1999, PD1–11, pp. 22–23.

M. Eiselt et al., "Cross–Phase Modulation in an L–Band EDFA," Photonics Technology Letters, Institute of Electrical and Electronics Engineers, 1999, vol. 11, pp. 1575–1577.

(Continued)

*Primary Examiner*—Mark Hellner
(74) *Attorney, Agent, or Firm*—Eric J. Robinson; Robinson Intellectual Property Law Office, P.C.

(57) ABSTRACT

By optimizing the refractive index profile, the absorption coefficient of a rare earth element doped optical fiber can be enlarged and nonlinear effect can be suppressed. Thus, according to the present invention, the optical fiber, which is suitable for wide band optical amplification, can be realized. Moreover, in the present invention, the optical fiber of W-shape profile comprising a core, the first cladding having a refractive index smaller than that of said core surrounding said core, and the second cladding having a refractive index smaller than that of said core and larger than that of said first cladding surrounding said first cladding is prepared and are suitable for the wide band optical amplification. That is, since in the rare earth element optical fiber of this W-shape profile, both the absorption coefficient of a rare earth element, and the absolute value of chromatic dispersion can be increased greatly as compared to the optical fiber of the conventional step index profile and nonlinear effect can be suppressed more efficiently, an optical fiber which is suitable for further wide band optical amplification, is realizable.

5 Claims, 11 Drawing Sheets

OTHER PUBLICATIONS

S. Ishikawa et al., "High Gain Per Unit Length Silica–Based Erbium Doped Fiber for 1580nm Band Amplification," Optics Amplifiers and their Applications, 1998, TuC4, pp. 64–67.

N. Shibata et al., "Experimental Verification of Efficiency of Wave Generation Through Four–Wave Mixing in Low–Loss Dispersion–Shifted Single–Mode Optical Fibre," Electronics Letters, 1988, vol. 24, pp. 1528–1529.

R. I. Laming et al., "Saturated Erbium–Doped Fibre Amplifiers," Technical Digest, Optics Amplifiers and their Applications, 1990, pp. MB3/16–MB3/19.

K. Aiso et al., "Erbium Lanthanum co–doped Fiber for L–Band Amplifier with High Efficiency, Low Non–Linearity and Low NF," Optical Fiber Communication Conferece and Exhibit, 2001, pp. TuA6–1–TuA6–3.

* cited by examiner

OPTICAL FIBER FOR OPTICAL AMPLIFIER

TECHNICAL FIELD

The present invention relates to an optical fiber applied to an optical amplifier suitable for optical communications and other related applications.

BACKGROUND OF THE INVENTION

The volume of communication information data tends to greatly increase with the advancement of the information society. Investigations have been vigorously performed to increase the capacity of data transmission. Consequently, increase in the capacity of a wavelength division multiplexing (WDM) optical transmission system (increase of the number of channels, expansion of a transmission band, etc.) is under development.

WDM transmission is a system transmitting and receiving WDM signals of a plurality of wavelengths through one optical fiber, and for increasing the capacity of the WDM transmission, it is indispensable to realize a wide band optical fiber amplifier, amplifying the signals.

The optical fiber amplifier using an Erbium (Er) doped optical fiber plays an important role as a key device in WDM system.

The conventional Er-doped optical fiber comprises of a core 1 and a cladding 5 having a refractive index smaller than that of the core, as shown in FIG. 9(A). The refractive index profile of the core 1 is a step index type profile, and it is doped with the rare earth element Er. In addition, as shown in this figure, "a" shows the diameter of the core 1 and is defined as the diameter of the core at one-tenth maximum of refractive index.

The amplification band of an Er-doped optical fiber accords with the 1550 nm wavelength band where transmission loss of the transmission fibers becomes lowest. Moreover, the Er-doped optical fiber has high amplification efficiency in the amplification band, even if the host glass silica is doped with Er, wherein the amplification band of the Er-doped optical fiber covers the wavelength band of 1530 nm~1560 nm, called as C-band.

In addition to the above-mentioned C-band, the wavelength band of WDM transmission light has been further expanded even to the wavelength band of 1570 nm~1600 nm, called as L-band, in recent years.

Although a conventional Er-doped optical fiber developed for C-band is applicable to L-band, its gain per unit length in L-band is smaller than that in C-band. Therefore, in order to obtain a gain in L-band equivalent to that in C-band by using the conventional Er-doped optical fiber, longer length, by several times of the Er-doped optical fiber, is necessary.

Moreover, the increase in the number of channels accompanying increase of the capacity of WDM transmission leads to the increase of the signal light intensity input into an Er-doped optical fiber. Therefore, an Er-doped optical fiber is required for a higher saturation output power.

However, the increase of the length of Er-doped optical fiber and the increase of the signal light intensity input to an Er-doped optical fiber cause adverse nonlinear effects in an Er-doped optical fiber amplifier such as four-wave mixing (FWM), the cross phase modulation (XPM), etc.

In order to suppress such nonlinear effects, it is effective to increase the gain coefficient (gain per unit length) of the Er-doped optical fiber. A gain coefficient can be expressed by the following equation (1).

$$G(\lambda)=\alpha(\lambda)\cdot[n_2\cdot\{\sigma_e(\lambda)/\sigma_a(\lambda)+1\}-1] \quad (1)$$

Here, $\lambda$ is the wavelength, $G(\lambda)$ is a gain coefficient having the unit of dB/m and $\alpha(\lambda)$ is an absorption coefficient of the rare earth element doped optical fiber for optical amplification, and is the absorption coefficient of Er-doped optical fiber in this case. The unit of the absorption coefficient is dB/m.

$\sigma_a(\lambda)$ is the absorption cross section, $\sigma_e(\lambda)$ is the stimulated emission cross section and $n_2$ is the ratio of upper laser level's Er density to total Er density. The gain coefficient, the absorption coefficient, the absorption cross-section, and the stimulated emission cross section have wavelength ($\lambda$) dependence.

The ratio of the stimulated emission cross section and the absorption cross section, in equation 1, is determined according to the host glass, and $n_2$ is determined by the excitation conditions (population inversion). Therefore, in order to raise a gain coefficient, it is necessary to increase the absorption coefficient $\alpha(\lambda)$.

This absorption coefficient is proportional to the density of Er ions as well as the overlap integral between the Er ions distribution and the optical mode envelope. Therefore, in order to enhance the gain coefficient in an Er-doped optical fiber, increasing the Er dopant concentration and/or enlarging the overlap integral is being taken up.

Moreover, enlargement of the value of chromatic dispersion can also suppress the nonlinear effects. It is known that the generation of four-wave mixing will increase rapidly due to phase matching, if zero dispersion wavelengths exist in a transmission wavelength region. Therefore, in order to reduce the generation of four-wave mixing, generally the absolute value of the chromatic dispersion in transmission wavelength is increased greatly, and kept them away from phase matching conditions.

However, in the conventional Er-doped optical fiber, owing to the concentration quenching, a limitation to the doping density concentration of the Er ions exists. Concentration quenching is a phenomenon, which produces energy loss because, as the concentration of the dopant element, Er in the present case increased the distance between Er ions is shortened and the ion-ion interactions occur.

In the case of $Al_2O_3$—$SiO_2$ host wherein Aluminum is co-doped to suppress the effect of concentration quenching, a reduction in the conversion efficiency occurs, when the dopant concentration of Er exceeds 1000 wtppm, due to the concentration quenching. Therefore, the Er concentration cannot be increased drastically over 1000 wtppm though it is chosen from a general balance of the decline of this conversion efficiency, increase in the absorption coefficient, etc.

On the other hand, shifting the cutoff wavelength to a long wavelength side and doping Er throughout the core part increases the overlap integral between the Er ions distribution and the optical mode envelope. In order to shift the cutoff wavelength to a long wavelength side, it is effective to enlarge the core diameter.

However, the cutoff wavelength must be shorter than the pump or signal wavelength to ensure the single mode propagation. Therefore, the above mentioned overlap integral enlargement, by lengthening the cutoff wavelength, also has limitations.

As mentioned above, in the conventional Er-doped optical fiber, because of the limitations on the overlap integral enlargement and also on the Er doping concentration, a limit existed to the enhancement of the gain coefficient by increasing the absorption coefficient.

Moreover, in an Er-doped optical fiber, the relative refractive index difference of the core to the cladding and the cutoff wavelength are determined from a viewpoint of improvement in the amplification characteristics. And since chromatic dispersion is uniquely decided by the relative refractive index difference and the cutoff wavelength, the flexibility of the adjustment is low. Therefore, in the conventional Er-doped optical fiber, a limit existed also in the enlargement of the absolute value of chromatic dispersion.

SUMMARY OF INVENTION

To solve the above mentioned problem, in the present invention an optical fiber, which has large absorption coefficient of Er, compared with the conventional Er-doped optical fiber, has been provided for wide band optical amplification in which the nonlinear effects are suppressed.

In order to attain the above-mentioned purpose, the following optical fiber with the characteristics mentioned therein is proposed: an optical fiber comprising a core which is doped with at least one kind of rare earth element, a first cladding surrounding the said core, the refractive index of which is smaller than said core, and a second cladding surrounding the said first cladding, the refractive index of which is smaller than that of said core and greater than that of said first cladding.

In one embodiment of the present invention, the refractive index profile of the above-mentioned core is α-profile.

Besides this invention, an optical fiber comprising a core, which is doped with at least one kind of rare earth element and which has an α-profile, and a cladding surrounding the said core, the refractive index of which is smaller than said core, is also proposed.

In one embodiment of the present invention, one of the rare earth elements doped in the above-mentioned core is Er.

In one embodiment of the present invention, the absorption coefficient of Er-doped optical fiber at 1530 nm is 12 dB/m or more.

In one embodiment of the present invention, at least one rare earth element among Y, La, Ce, Pr, Nd, Sm, Eu, Gd, Tb, Dy, Ho, Tm, Yb, and Lu is co doped with Er.

In one embodiment of the present invention, the absolute value of the chromatic dispersion in signal light wavelength is higher than that of an optical fiber which has a core which is doped with at least one kind of rare earth element, and surrounded by a cladding whose refractive index is smaller than this core, the refractive index profile of this core being step index profile.

BRIEF DESCRIPTION OF DRAWINGS

FIG. 1(A) and FIG. 1(B) are the diagrams showing the refractive index profile of the optical fiber of the first embodiment of the present invention, in which FIG. 1(B) shows the cross sectional structure of an optical fiber having a refractive index profile like FIG. 1(A).

FIG. 3(A) and FIG. 3(B) are the diagrams showing the refractive index profile of the optical fiber of W-shape profile, in which FIG. 3(B) shows the cross sectional structure of an optical fiber having refractive index profile like FIG. 3(A).

FIG. 4(A) and FIG. 4(B) are the diagrams showing the refractive index profile of the optical fiber of α-profile, in which FIG. 4(B) shows the cross sectional structure of an optical fiber having refractive index profile like FIG. 4(A).

FIG. 10(A) and FIG. 10(B) are the diagrams showing the refractive index profile of the optical fiber of DSC profile, in which FIG. 10(B) shows the cross sectional structure of an optical fiber having refractive index profile like FIG. 10(A).

DETAILED DESCRIPTION OF THE EMBODIMENTS

Hereinafter, the preferred embodiments of this invention are described with reference to the drawings. In addition, in the explanation of these embodiments, the same code is given to the same part as in the conventional example, and the repetition explanation is omitted or simplified. The refractive index profile of the first embodiment of the optical fiber according to the present invention is shown in FIG. 1(A), and the cross sectional structure of the optical fiber of this embodiment is typically shown in FIG. 1(B).

In FIG. 1(A), FIG. 1(B), FIG. 3(A), FIG. 3(B), FIG. 10(A), and FIG. 10(B), a code 1 corresponds the core, a code 2 corresponds the first cladding and a code 5 corresponds the second cladding. And in FIG. 4(A), FIG. 4(B), FIG. 9(A), and FIG. 9(B), a code 1 corresponds the core and a code 5 corresponds the second cladding.

Figure 1:
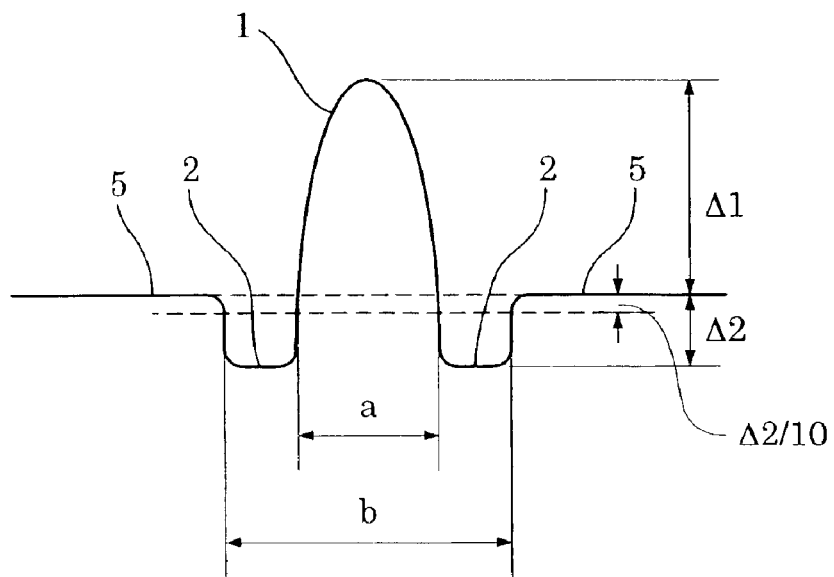
Figure 1:
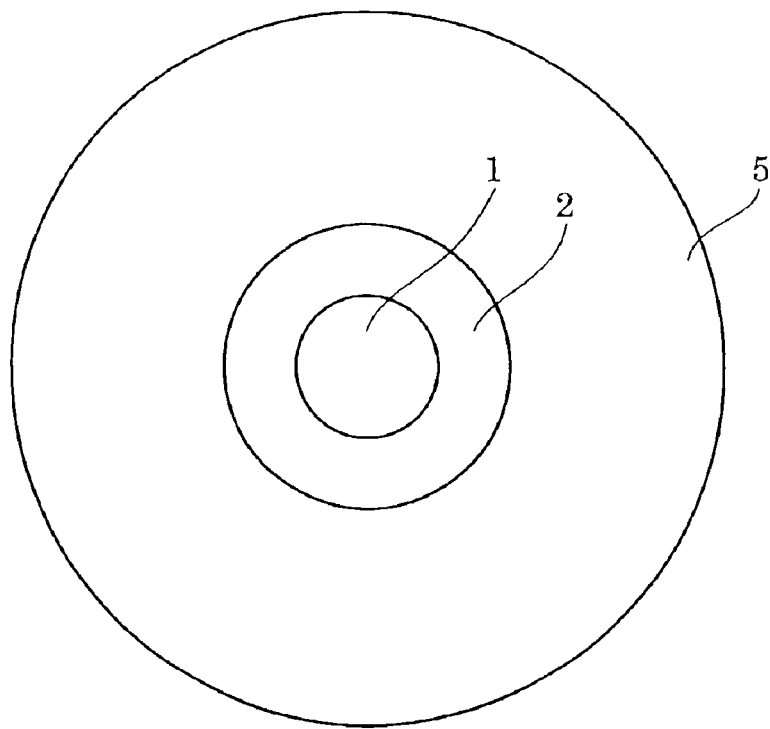

As shown in the FIG. 1(A), the optical fiber of the first embodiment is an optical fiber of W-shape profile which is formed with a core 1 at the center, the first cladding 2 whose refractive index is smaller than the core 1 surrounding the core 1, and the second cladding 5 whose refractive index is higher than the first cladding 2 but smaller than the core 1 surrounding the first cladding 2.

Figure 9:
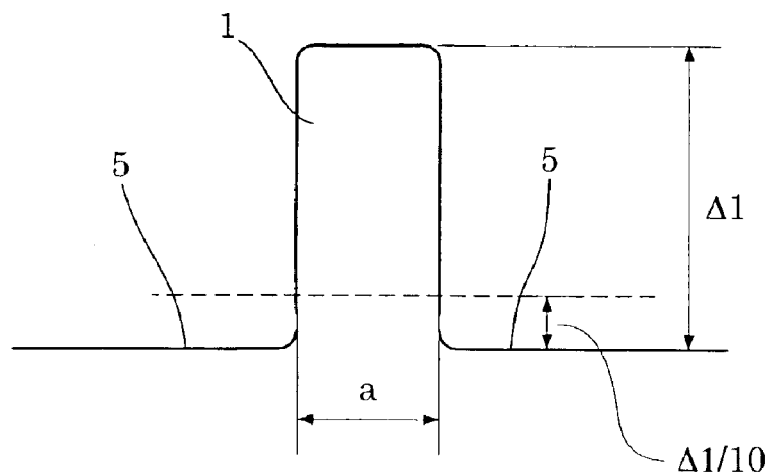
FIG. 9(A) and FIG. 9(B) are the diagrams showing the refractive index profile and the cross sectional composition of the optical fiber of a step index profile, respectively.
Figure 9:
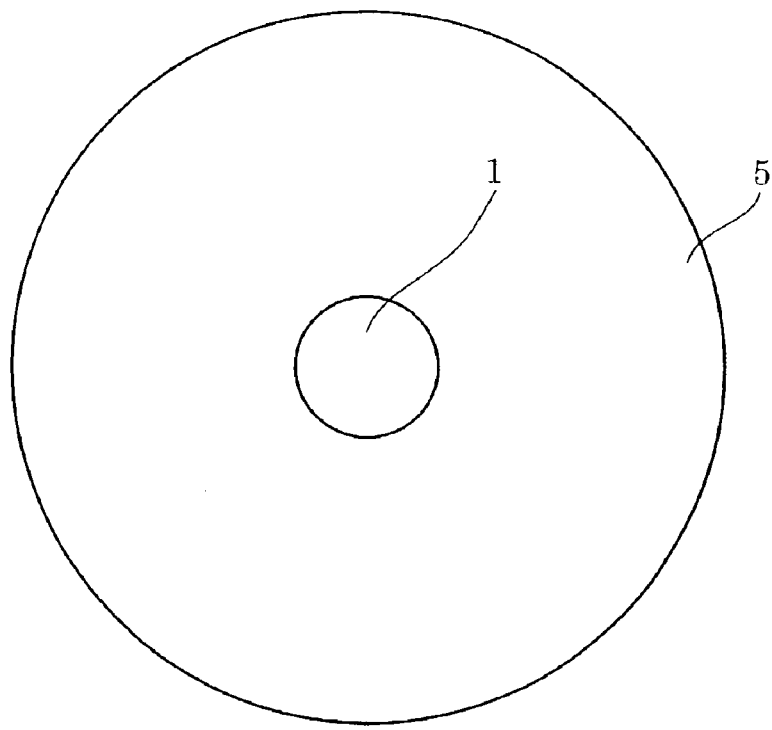

Also, the refractive index of the second cladding 5 in this first embodiment, formed at the outermost circumference of the optical fiber, is the base refractive index like that of the cladding 5 in the optical fiber of the step index profile shown in FIG. 9(A) and hence, the same code 5 is used in the figures.

Moreover, as shown in FIG. 1(A), the diameter of the core 1 is "a" and the diameter of the first cladding 2 is "b". In this specification, the diameter "a" of the core 1 in the optical fiber of W-shape profile is defined as the diameter at the position of the refractive index equivalence to that of the second cladding. Moreover, the diameter "b" of the first cladding is defined as the diameter at one-tenth of Δ2 at the boundary between the first cladding and the second cladding.

In this embodiment of the present invention, at least one kind of rare earth element is doped in the core 1, and the rare earth element doped in the core 1 is Er here. Moreover, the refractive index profile of the core 1 is α-profile.

An influence of the refractive index profile of a rare earth doped optical fiber, on the overlap integral between the rare earth element distribution and optical mode envelope, was examined in detail by the inventor before deciding the above refractive index profile.

Consequently, an effective refractive index profile to enlarge the above-mentioned overlap integral was found for the first time.

The following equation (2) can express the absorption coefficient α(λ) in a rare earth doped optical fiber.

$$\alpha(\lambda)=\rho_0 \cdot \sigma_a(\lambda) \cdot (2/\omega^2) \cdot \int \{\rho(r)/\rho_0\} \cdot \Psi(r) \cdot r dr \quad (2)$$

Here, $\rho_0$ is the density of Er ions, $\rho(r)$ is the density distribution of Er ions, $\sigma_a(\lambda)$ is the absorption cross section, ω is a power mode radius, Ψ(r) is mode envelope, r is the radius of the optical fiber and r=0 is the center of an optical fiber.

Moreover, if density of Er ions distribution ρ(r) is assumed to be uniform in the direction along the diameter of a core and the mode envelope Ψ(r) is approximated by Gaussian, the equation (2) can be simplified as an equation (3).

$$\alpha(\lambda)=\rho_0 \cdot \sigma_a(\lambda) \cdot [1-\exp\{-a^2/(4\omega^2)\}] \quad (3)$$

Here, "a" is the core diameter. For every refractive index profile, the power mode radius ω was determined by numerical computation, and the absorption coefficient α(λ) of the Er-doped optical fibers for different cutoff wavelengths $\lambda_c$ was calculated from the above-mentioned equation (3), and it was shown as characteristic lines 2A~2D in FIG. 2.

Figure 2:
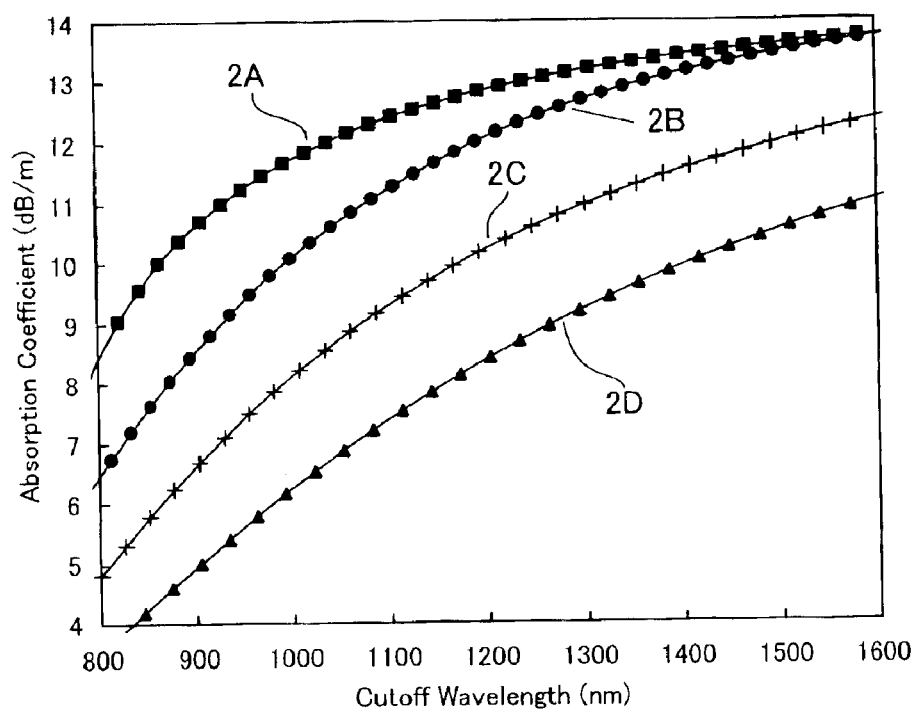
FIG. 2 is a graph, which shows the relation between the refractive index profile of an optical fiber, and the absorption coefficient of Er-doped optical fiber.

In the calculation of absorption coefficient α(λ) in FIG. 2, the wavelength of the signal light is 1530 nm, Er ion density $\rho_0$ is 8.5E+24 ($m^{-3}$) equivalent to a wt. percentage of 1000 wtppm, and the absorption cross section $\sigma_a$ at 1530 nm is 4.0E+25 ($m^2$)

Figure 3:
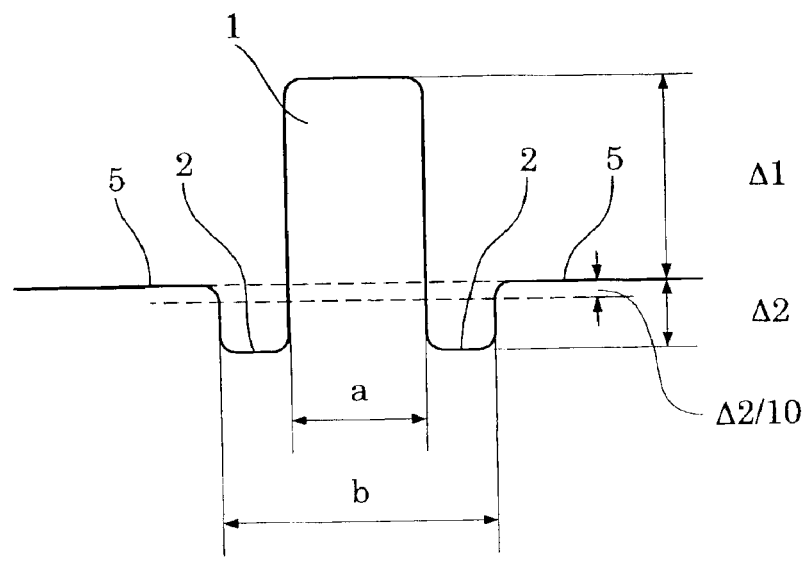
Figure 3:
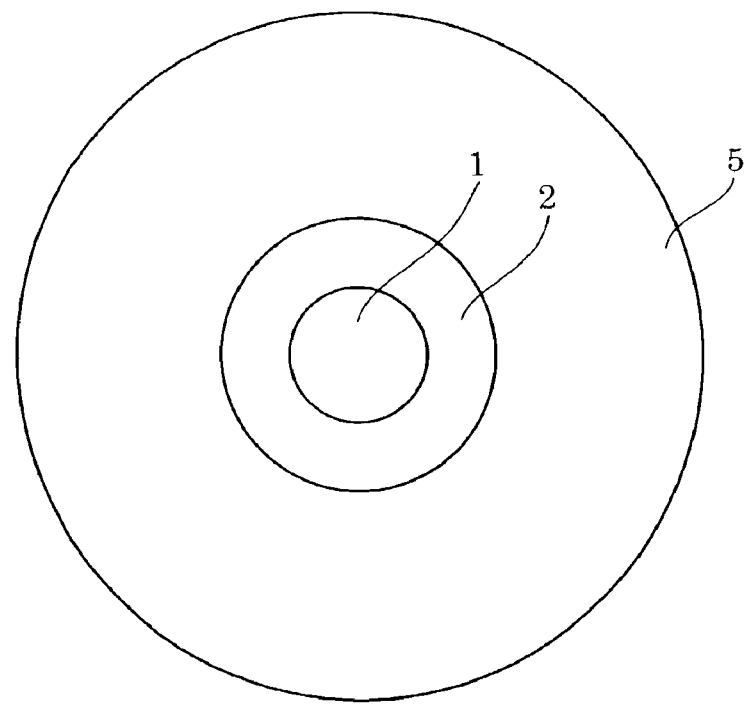
Figure 4:
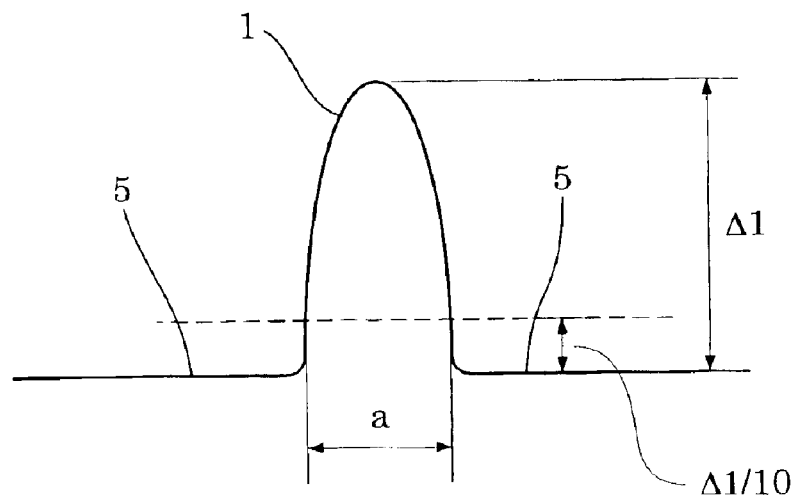
Figure 4:
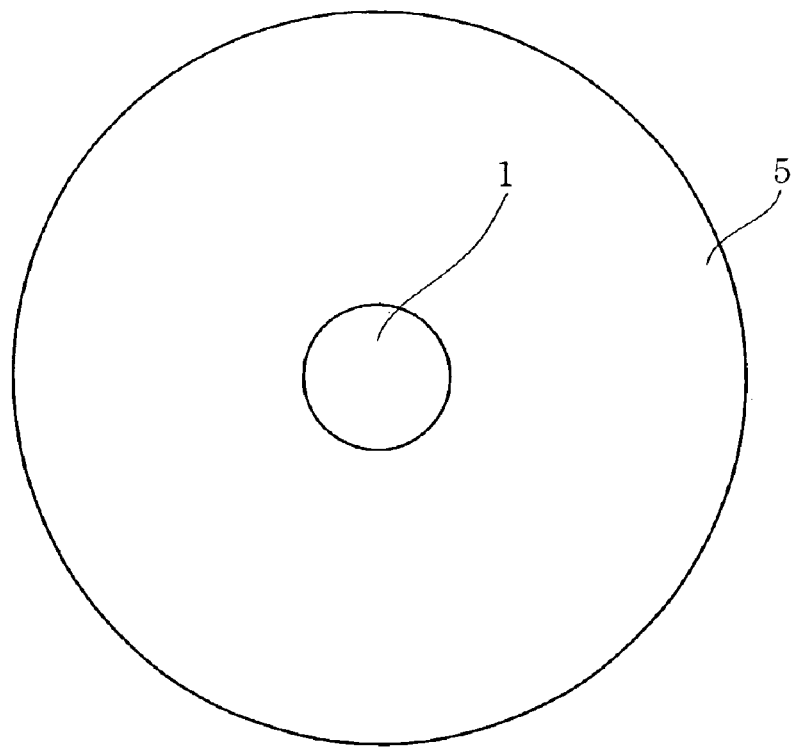

In the FIG. 2, the characteristic line 2A is the absorption coefficient of Er-doped optical fiber of W-shape profile, shown in FIG. 3(A), determined at Δ2/Δ1=−0.55 and a/b= 0.5, the characteristic line 2B is the absorption coefficient of Er-doped optical fiber of α-profile shown in FIG. 4(A), where α is set to 4. Er is added in the core 1 of the optical fiber of the refractive index profile shown in FIGS. 3(A) and 4(A). The relative refractive index differences Δ1 and Δ2 and α are explained later.

Moreover, in the W-shape profile shown in FIG. 3(A), the refractive index profile of the core 1 is a step index profile, and differs from the refractive index profile of the optical fiber of an embodiment which has the refractive index profile shown in FIG. 1(A).

In addition, in FIG. 3(A), "a" and "b" shows the diameters of the core 1 and the first cladding 2 respectively, and in FIG. 4(A), "a" shows the diameter of the core 1. The diameters "a" and "b" in FIG. 3(A) are defined in the same manner as the diameters "a" and "b" in FIG. 1(A), and the diameter "a" in FIG. 4(A) is defined in the same manner as the diameter "a" in FIG. 9(A).

Characteristic line 2C of FIG. 2 is the absorption coefficient of Er-doped optical fiber of the conventional step index profile shown in FIG. 9(A). This optical fiber is also doped with Er in the core 1.

Figure 10A:
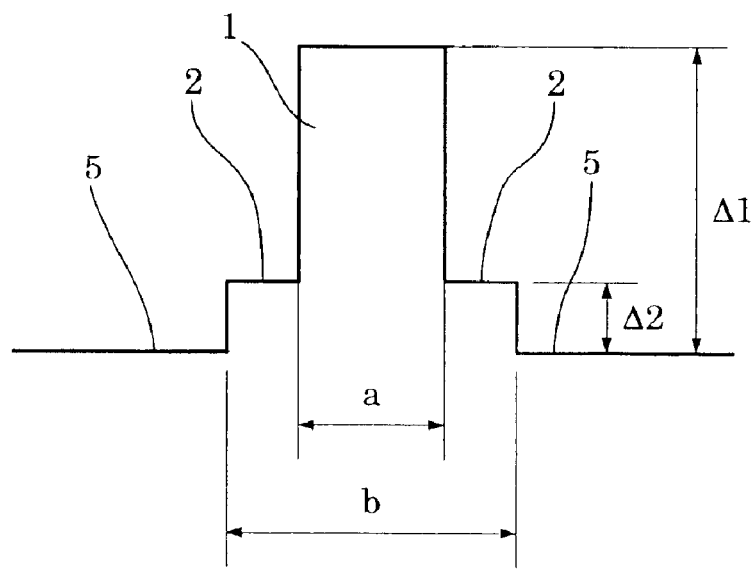
Figure 10:
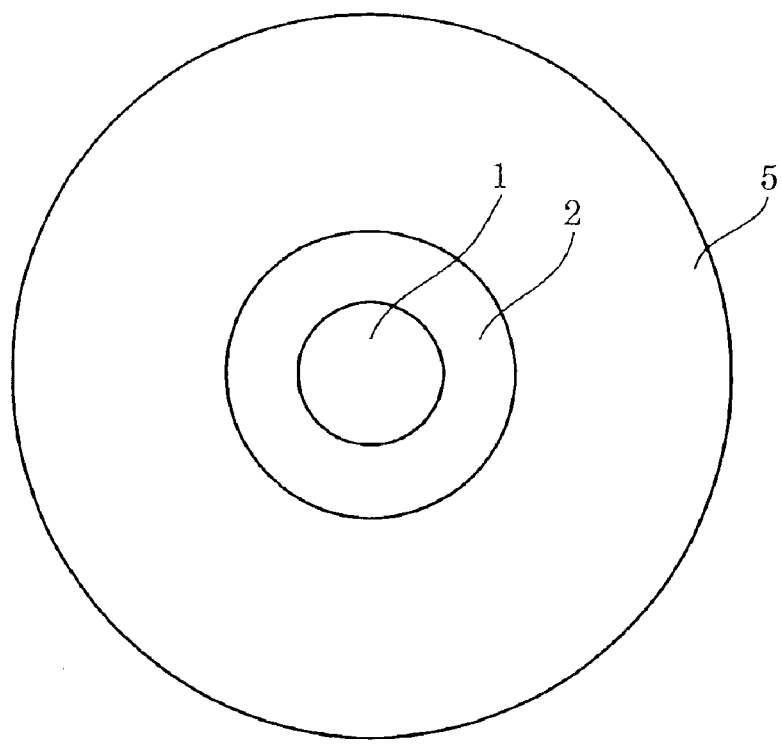

Characteristic line 2D of FIG. 2 is the absorption coefficient of Er-doped optical fiber of the dual step (DSC) profile shown in FIG. 10(A), determined at Δ2/Δ1=+0.15 and a/b=0.5.

As shown in FIG. 10(A), the optical fiber of DSC profile is formed with the first cladding 2 having a refractive index smaller than the core 1 surrounding the inner core 1 and the second cladding 5 having a still smaller refractive index surrounding the first cladding 2. This optical fiber is also doped with Er in the core 1, and the diameter of the first cladding 2 is "b".

As shown in characteristic line 2A and characteristic line 2B of FIG. 2, Er-doped optical fibers which have the refractive index profiles shown in FIG. 3(A) and FIG. 4(A) have the larger absorption coefficient of Er-doped optical fibers compared with Er-doped optical fiber of the conventional step index profile. On the contrary, Er-doped optical fiber that has the refractive index profile shown in FIG. 10(A) has a smaller absorption coefficient compared with the conventional step index Er-doped optical fiber.

Therefore, by making the refractive index profile of the optical fiber as W-shape profile as shown in FIG. 3(A), or making it α-profile as shown in FIG. 4(A), the absorption coefficient of Er-doped optical fiber could be enlarged.

In addition, when value 8.5E+24 ($m^{-3}$) of the Er density $\rho_0$ employed in the above-mentioned calculation is converted into weight percent concentration, it corresponds to about 1000 wtppm or 0.1 wt %. In the case of $Al_2O_3$—$SiO_2$ host, co-doped with aluminum, if Er concentration exceeds 0.1 wt %, the decline of conversion efficiency by concentration quenching begins to occur. And for example, this phenomenon is reported by R. I. LAMING, D. N. PAYNE, F. MELI, G. GRASSO, E. J. TARBOX, "SATURATED ERBIUM-DOPED FIBRE AMPLIFIERS", Technical Digest, Optical Amplifiers and their Applications, 1990, and MB3 grade.

Even if the cutoff wavelength is set to higher values close to the signal light wavelength, the maximum value of the absorption coefficient of Er-doped optical fiber of step index profile could be only 12 dB/m at the most, as seen clearly from the characteristic line 2C of FIG. 2.

On the other hand, the absorption coefficient of Er-doped optical fiber of W-shape profile at 1530 nm will exceed 12 dB/m, if the cutoff wavelength is set as 1050 nm or more, as seen clearly from the characteristic line 2A of FIG. 2. Moreover, the absorption coefficient of Er doped optical fiber of α-profile at 1530 nm will be 12 dB/m or more, if the cutoff wavelength is set as 1200 nm or more, as seen clearly from characteristic line 2B of FIG. 2.

In order to ensure the single mode propagation of the pump light, the cutoff wavelength must be shorter than the pump light wavelength. Generally the pump light wavelength used for EDFA is 980 nm or 1480 nm, and since when using 1480 nm excitation, the cutoff wavelength can be allowed to the longer wavelength side, compared to 980 nm excitation, 1480 nm excitation becomes advantageous from the viewpoint of overlap integral expansion.

Here, the difference in the absorption coefficient of Er-doped optical fibers at 1530 nm for different refractive index profiles, when the cutoff wavelength is less than 980 nm, is described. The absorption coefficient in the Er doped optical fiber of step index profile, will be 8 dB/m or less, as seen clearly from characteristic line 2C of FIG. 2.

In the Er-doped optical fiber of W-shape profile, or the Er-doped optical fiber of α-profile, even if the cutoff wavelength is set to 980 nm or less, the absorption coefficients are higher value as seen clearly from the characteristic lines 2A and 2B of FIG. 2.

Especially, Er-doped optical fibers of W-shape profile have larger effect of the absorption coefficient expansion compared with the optical fibers of other types of refractive index profile in the domain of short cutoff wavelength, and an absorption coefficient is made as for it to the value near 12 dB/m by cutoff wavelength as for 980 nm or less.

Figure 5:
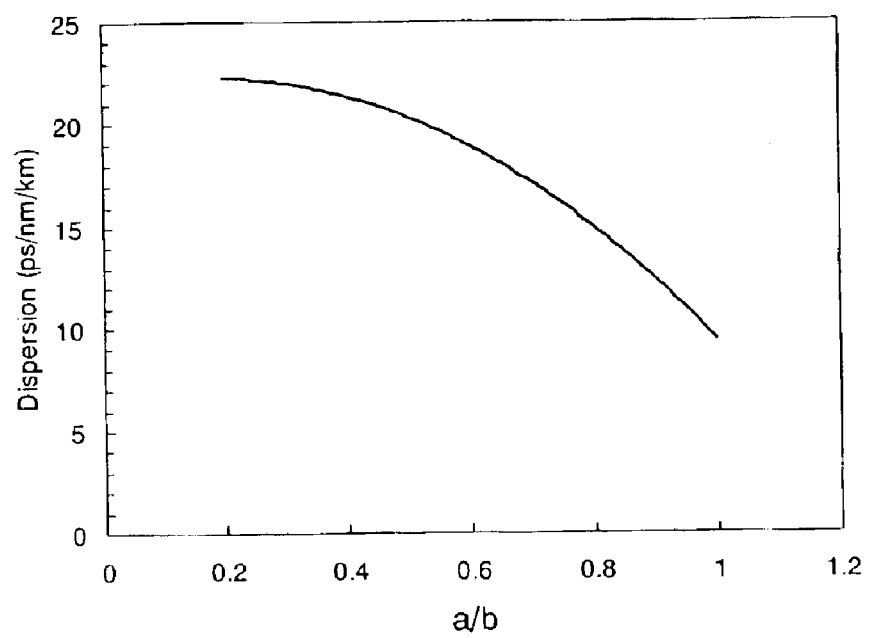
FIG. 5 is a graph, which indicates the relationship between the ratio of the diameters of the core and the first cladding and the chromatic dispersion, in the optical fiber of W-shape profile.

Next, by making the ratio (a/b) of the diameters of the core 1, (a), and first cladding 5, (b), as a parameter, the variation of the values of chromatic dispersion of Er-doped optical fibers of W-shape profile shown in FIG. 3(A), at 1580 nm was calculated. The result is shown in FIG. 5 in which the cut off wavelength is set as 1450 nm. Moreover, in FIG. 5, when a/b=1, it corresponds to the optical fiber of step index shown in FIG. 9(A).

Then, by making the ratio (Δ2/Δ1) of the relative refractive index differences of the core 1, (Δ1), and second cladding 5 (Δ2), as a parameter, the variation of the values of chromatic dispersion of Er-doped optical fibers of W-shape profile shown in FIG. 3(A), at 1580 nm was calculated for different values of "a/b". The results are shown as the characteristic lines 6A–6C of FIG. 6. In this case also the cutoff wavelength of the optical fiber is set as 1450 nm. Characteristic line 6A corresponds to a/b set to 0.2, 6B to a/b set to 0.5 and 6C to a/b set to 0.8.

Moreover, in this setting, the relative refractive index differences Δ1 and Δ2 and the refractive index distribution of the α-profile n(r) are defined by the following Equations (4), (5) and (6). In addition, in the Equations (4), (5), and (6), $n_{c1}$ represents the maximum value of the refractive index of core 1, $n_{c2}$ represents the minimum value of refractive index of the first cladding 2 and $n_s$ expresses the value of the refractive index of second cladding 5.

$$\Delta 1 = \{(n_{c1} - n_s)/n_{c1}\} \times 100 \quad (4)$$

$$\Delta 2 = \{(n_{c2} - n_s)/n_{c2}\} \times 100 \quad (5)$$

$$n(r) = n_{c1} \cdot \{1 - 2 \cdot \Delta 1 \cdot (2r/a)^\alpha\}^{1/2} \quad 0 \leq r \leq a/2 \quad (6)$$

n(r) expresses the refractive index at the radius "r".

Figure 6:
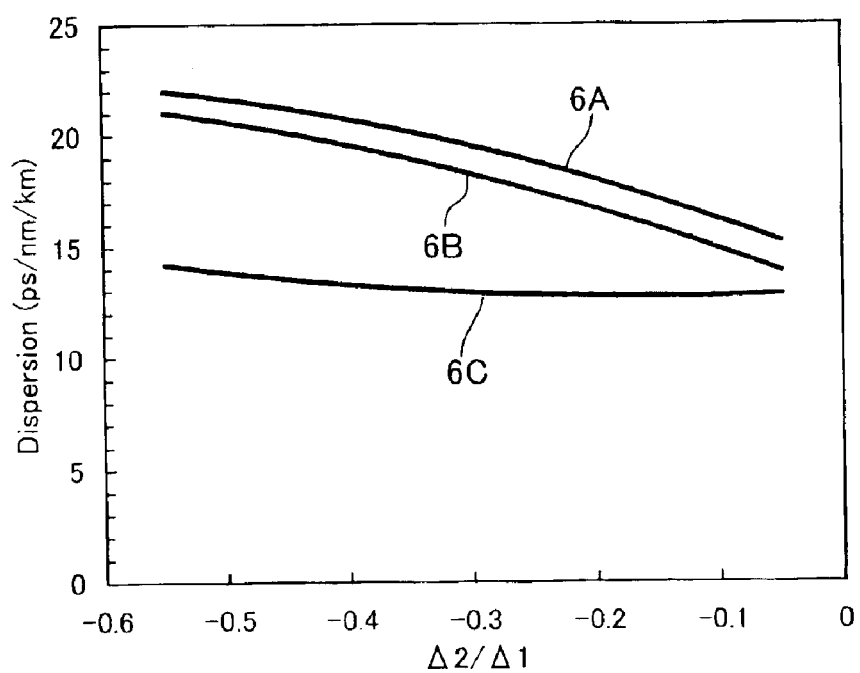
FIG. 6 is a graph showing the relationship between the ratio of the relative refractive index difference and the chromatic dispersion in the optical fiber of W-shape profile, when the cut off wavelength is set to 1450 nm.

In FIG. 6, when Δ2/Δ1 is set to 0, (in other words when Δ2=0), it becomes the optical fiber of step index as shown in FIG. 9(A). Moreover, characteristic lines 6A, 6B and 6C in FIG. 6, correspond to the ratio a/b set to 0.2, 0.5 and 0.8, respectively.

Then, in the same manner, the variation of the values of chromatic dispersion of Er-doped optical fibers of W-shape profile shown in FIG. 3(A), with Δ2/Δ1 at 1580 nm for different values of "a/b" was calculated, setting the cutoff wavelength as 900 nm. The result is shown in FIG. 7 wherein, the characteristic lines 7A, 7B and 7C correspond to the ratio of a/b set at 0.2, 0.5 and 0.8, respectively.

When cutoff wavelength is set as 1450 nm, the absolute value of the chromatic dispersion of the optical fiber of W-shape profile is larger than that of the optical fiber of step index profile, as seen clearly from FIG. 5 and FIG. 6.

Figure 7:
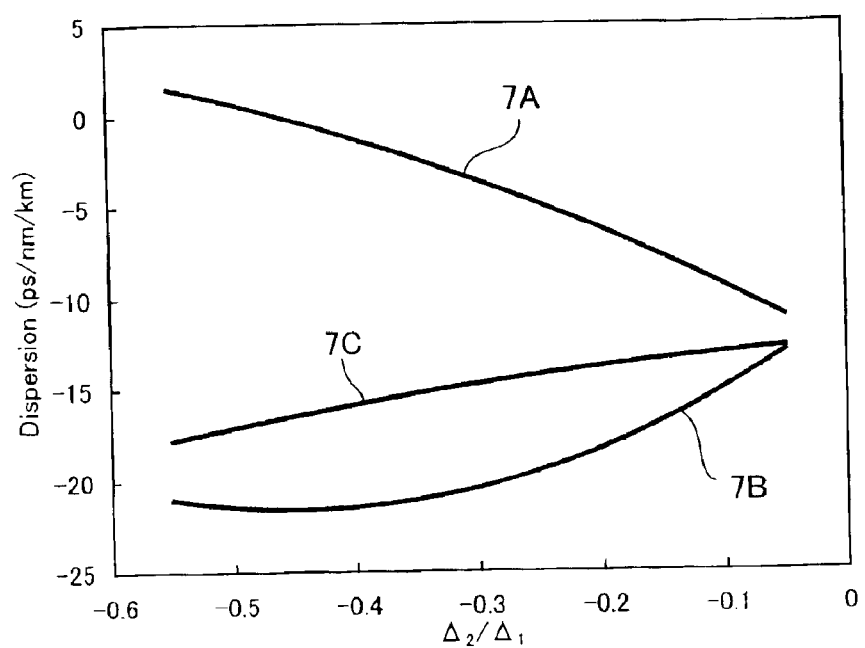
FIG. 7 is a graph showing the relationship between the ratio of a relative refractive index difference and the chromatic dispersion in the optical fiber of W-shape profile, when the cut off wavelength is set to 900 nm.

Moreover, although a dispersion value varies very much with "a/b", when cutoff wavelength is set as 900 nm, as seen clearly from FIG. 7, by carefully selecting the value of a/b, the absolute value of the chromatic dispersion can be made larger than the optical fiber of step index profile.

Thus, the inventors found that by optimizing the values of the ratio of the diameters "a/b" and the ratio of the relative refractive index differences Δ2/Δ1, for a specific cutoff wavelength, both the absorption coefficient and value of the absolute of the chromatic dispersion can be made higher in a W-shape profile optical fiber compared to that of the conventional step index profile optical fiber.

Having found the advantages of an optical fiber of W-shape profile for optical amplification, the inventors constructed an Er-doped optical fiber of W-shape profile, as shown in FIG. 1(A) whose core 1 has an α-profile, and calculated the absorption coefficient by using the above-mentioned equation (3). This calculation result is shown as a characteristic line 8A of FIG. 8.

Figure 8:
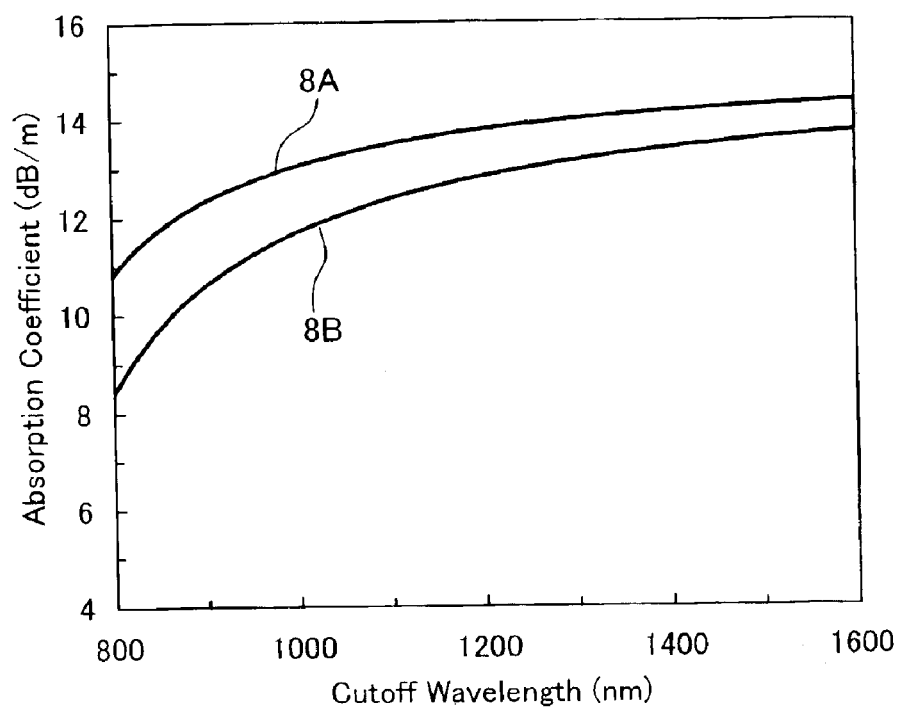
FIG. 8 is a graph, which shows the relationship between the cutoff wavelengths and the absorption coefficients for the two different shapes of refractive index profiles.

In the calculations of the characteristic line 8A of FIG. 8, the same conditions used in the calculations of the characteristic lines 2A–2D of FIG. 2 are used. The characteristics of the Er-doped optical fiber of W-shaped profile, as shown in FIG. 3(A) in which the profile of the core 1 was step index, is shown as 8B of FIG. 8.

Comparison of the characteristic lines 8A and 8B of FIG. 8 showed that the absorption coefficient of Er-doped optical fiber could be enlarged further by making the core 1 to α-profile.

Er-doped optical fiber of the first embodiment, which has the refractive index profile, as shown in FIG. 1(A), could attain both a higher absorption coefficient and higher absolute value of chromatic dispersion as compared to optical fiber of the conventional step index profile. Therefore, the optical fiber of the first embodiment can suppress the nonlinear effect efficiently and thus the optical fiber, which is suitable for wide wavelength band optical amplification, can be realized.

The optical fiber of the second embodiment has a W-shape profile as shown in FIG. 3(A). That is, the optical fiber of the second embodiment is an optical fiber that has almost the same composition as the above-mentioned first embodiment, and used the refractive index profile of the core 1 as the step index.

The optical fiber of the second embodiment could also have both higher absorption coefficient and higher absolute values of chromatic dispersion than that of an optical fiber of the conventional step index and is suitable for wide band optical amplification like the first embodiment.

The optical fiber of the 3rd embodiment has an α-profile as shown in FIG. 4(A), based on the investigation results, as mentioned in the first embodiment.

That is, the optical fiber of the 3rd embodiment is prepared by surrounding the core 1, which has α-profile, with the cladding 5 whose refractive index is smaller than that of the core 1. Also, at least one kind of rare earth element, Er in the present case, is doped in to the core 1.

The optical fiber of the 3rd embodiment can have an absorption coefficient larger than that of Er-doped optical fiber having the conventional step index profile, and is suitable for wide band optical amplification, like the first and second embodiments.

Figure 11:
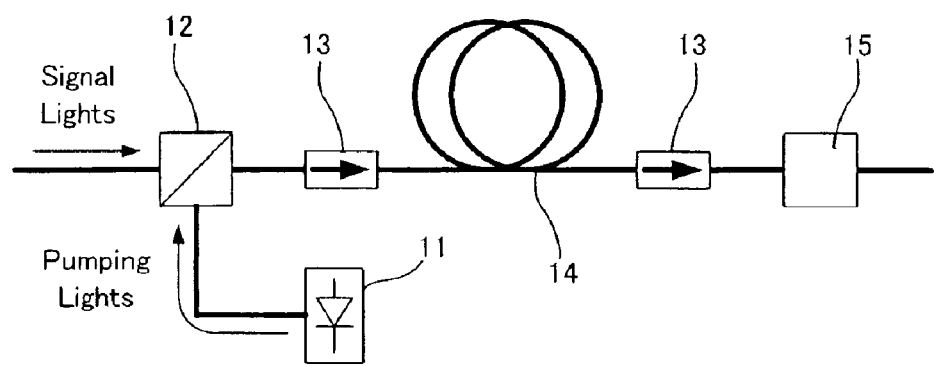
FIG. 11 is the diagram showing the composition of optical amplification using the optical fiber according to the present invention.

The composition of optical amplification using the optical fiber according to the present invention is described in FIG. 11. In FIG. 11, code 11 corresponds the source of pump light, code 12 corresponds the optical multiplexer, code 11 corresponds the optical isolator, and code 15 corresponds the filter. And code 14 corresponds the optical fiber according to the present invention.

EXAMPLES

The inventors made three test optical fibers according to the three embodiments mentioned before and compared the characteristics with a comparative conventional optical fiber having a refractive index profile as shown in FIG. 9(A). The results are given in Table 1.

TABLE 1

|  | Embodiment.1 | Embodiment.2 | Embodiment.3 | Comparative example |
|---|---|---|---|---|
| Core Material Composition | $Er_2O_3$—$Al_2O_3$—$GeO_2$—$SiO_2$ | $Er_2O_3$—$Al_2O_3$—$GeO_2$—$SiO_2$ | $Er_2O_3$—$Al_2O_3$—$GeO_2$—$SiO_2$ | $Er_2O_3$—$Al_2O_3$—$GeO_2$—$SiO_2$ |
| $\Delta 1$ (%) | 1.3 | 1.3 | 1.3 | 1.4 |
| $\Delta 2$ (%) | -0.55 | -0.55 | 0 | 0 |
| Cutoff wavelength (nm) | 1444 | 1422 | 1436 | 1433 |
| Refractive index profile | W-shape | W-shape | Simple index | Simple index |
| Refractive index profile of the core | α-profile (α = 3) | Step index | α-profile (α = 4) | Step index |
| Er density (m$^{-3}$) | | | 1.2E+25 | |
| Er absorption peak value (dB/m) (λ = 1530 nm) | 20.1 | 19.3 | 18.5 | 14.0 |
| Chromatic dispersion (ps/nm/km) (λ = 1580 nm) | 16.0 | 19.9 | 9.2 | 11.5 |
| FWM cross talk (dB) | -60.9 | -60.3 | -57.8 | -53.5 |
| "a": Core diameter (μm) | 7.2 | 7.4 | 5.9 | 5.2 |
| "b": first cladding diameter (μm) | 14.5 | 17.1 | — | — |

In the Table 1, Δ1 and Δ2 are the relative refractive index differences as mentioned before, in percentages, the Er absorption peak values which are equivalent to the absorption coefficients mentioned above, were measured at 1530 nm and the chromatic dispersion values were measured at 1580 nm.

Moreover, the Er concentration in the core 1, the relative refractive index difference Δ1 of the core 1 and the cutoff wavelengths in the case of the first, second and 3rd embodiments are adjusted to be almost equal to that of the comparative example. Moreover, the cutoff wavelength is the value measured by the method in accordance with ITU.T G.650.1

If the Er concentration in the core, the relative refractive index difference Δ1 and the cutoff wavelengths are set to be of same values, then the optical fibers of the embodiments 1 to 3 have large Er absorption coefficients at 1530 nm than that of the optical fiber of comparative example, as seen clearly from Table 1. Moreover, first and second embodiments have large absolute values of the chromatic dispersion at 1580 nm compared with the comparative example.

Thus, even if the optical fibers of each of above-mentioned embodiment have the same Er density and cutoff wavelengths as that of the conventional comparative example, they have higher absorption coefficients and it has been checked that the absolute value of chromatic dispersion could also be increased in a W-shape profile.

Moreover, the FWM cross talk shown in Table 1 was measured by the following experiments. A WDM signal of L-band having eight channels at the intervals of 100 GHz, the interval between 4th and 5th channels being 200 GHz, was launched and the FWM cross talk is measured between the 4th and 5th channels, at 1605 nm. Moreover, output power per channel was set to be 4 dBm/ch.

The measurement results of the FWM cross talk showed that the embodiments 1 to 3 could have a reduced FWM cross talk as compared to the comparative example. It can be said that this is the effect of increase of the absorption coefficient. Especially optical fibers of the embodiments 1 and 2 can have reduced FWM cross talk rather than that of the embodiment 3. This is because, their higher absolute value of chromatic dispersion kept them away from phase matching conditions.

As mentioned above, it has been proved that the optical fibers of embodiments 1 to 3 are the optical fibers which can control a nonlinear effect efficiently.

Next, the optical fiber of the 4th embodiment of the present invention is explained. The optical fiber of the 4th embodiment is an optical fiber which has W-shape profile as shown in FIG. 3(A), similar to the above-mentioned the second embodiment, but differs by having a rare earth element La, co-doped with Er in the core 1.

Next, the optical fiber of the 5th embodiment of the present invention is explained. The optical fiber of the 5th embodiment is an optical fiber which has W-shape profile as shown in FIG. 1(A), similar to the above-mentioned the first embodiment but differs by having a rare earth element La, co-doped with Er in the core 1.

As explained in the above-mentioned the first embodiment, Er-doped optical fiber of W-shape or α-profile, can have higher absorption coefficients compared with Er-doped optical fiber of a conventional step index profile, because the overlap integral between the Er ions distribution and the optical mode envelope is increased.

Another method of increasing the absorption coefficient of Er-doped optical fiber, besides the method of expanding the overlap integral, is to raise the upper limit of Er concentration in the conventional $Al_2O_3.SiO_2$ host, by suppressing the concentration quenching. Since the limitation for increasing the Er density $\rho_0$ is the reduction in the conversion efficiency due to concentration quenching, suppressing the concentration quenching can increase the absorption coefficient of the Er-doped optical fiber, as seen clearly from the equation (1).

In order to control this concentration quenching, the technique of co doping another rare earth elements other than Er ion with Er was proposed by K. Aiso et al., "Erbium Lanthanum co-doped fiber for L-band amplifier with high efficiency and low non-linearity and low NF", Optical Fiber Communication Conference and Exhibit, 2001 and TuA6, and the U.S. Pat. No. 6,463,201 grade.

By suppressing the concentration quenching, by co-doping, for example, La ion with the Er ion, it is possible to increase the concentration of Er ions up to several thousands of wtppm that is two times or more of the concentration limit in the conventional $Al_2O_3.SiO_2$ host.

Therefore, still higher absorption coefficients can be realized by combining the two techniques of increasing the Er density by suppressing the concentration quenching and the enhancement of the overlap integral.

The inventors manufactured two Er-doped optical fibers co-doped with La, according to the above mentioned 4th and 5th embodiments and measured the characteristics, results of which are shown in Table 2.

TABLE 2

|  | Embodiment.4 | Embodiment.5 |
|---|---|---|
| Core Material Composition | $Er_2O_3$—$La_2O_3$—$Al_2O_3$—$GeO_2$—$SiO_2$ | $Er_2O_3$—$La_2O_3$—$Al_2O_3$—$GeO_2$—$SiO_2$ |
| $\neq 1$ (%) | 0.9 | 0.9 |
| $\Delta 2$ (%) | −0.55 | −0.55 |
| Cutoff wavelength (nm) | 1375 | 1424 |
| Refractive index profile | W-shape | W-shape |
| Refractive index profile of the core | Step index | α-profile ($\alpha = 3$) |
| Er density ($m^{-3}$) | 1.9E+25 | |
| Er absorption peak value (dB/m) ($\lambda = 1530$ nm) | 30.9 | 32.0 |
| Chromatic dispersion (ps/nm/km) ($\lambda = 1580$ nm) | 20.6 | 18.4 |
| "a": Core diameter ($\mu$m) | 7.4 | 8.7 |
| "b": first cladding diameter ($\mu$m) | 14.9 | 17.4 |

The absorption coefficients of the optical fibers of embodiments 4 and 5 are higher than that of embodiments 1, 2 and 3, as seen clearly from Tables 1 and 2. Thus, further enhancement of the absorption coefficients could be obtained with an optical fiber, which is co-doped with La besides the Er ions.

Er absorption coefficient can be increased by adding the rare earth element (here La) which has the quenching control effect with Er ion like in the 4th embodiment, controlling concentration quenching accompanying the high density of Er ions.

When La is co-doped with the Er ion, the concentration quenching accompanying the high density of Er ions is suppressed and there is no degradation of the absorption coefficient. Thus, expansion of the absorption coefficient can be obtained compared to the Er-doped optical fibers of W-shape profile or a-profile, which are not co-doped with La.

In addition, this invention is not only limited to each of the above mentioned embodiments, but can take the form of various implementation. For example, the relative refractive index difference Δ1 of the core 1 with the second cladding and the relative refractive index difference Δ2 of the first cladding with the second cladding 5 in the above first, second, 4th, and 5th embodiment, the relative refractive index difference Δ1 of the core 1 with the cladding 5 in the 3rd embodiment are not limited and can be suitably selected.

Moreover, the diameters of the core 1 and the first cladding 2, in the above mentioned first, second, 4th, and the 5th embodiments, and the diameter of the core 1 in the above mentioned 3rd embodiment are not limited, and are determined suitably.

Furthermore, although each of the above mentioned embodiments are doped with a rare earth element Er at the core 1, the optical fiber of the present invention may be doped with two or more kinds of rare earth elements at the core 1.

Furthermore, the optical fiber of the present invention may be doped with one kind of rare earth elements other than Er in the core 1. The same effect as the above-mentioned 4th embodiment can be obtained by doping at least one element among Y, La, Ce, Pr, Nd, Sm, Eu, Gd, Tb, Dy, Ho, Tm, Yb, and Lu in the core.

What is claimed is:

1. The optical fiber comprising a core in which at least Er is included, a first cladding surrounding said core, the refractive index of which is smaller than said core, and a second cladding surrounding said first cladding, the refractive index of which is smaller than that of said core and greater than that of said first cladding, wherein the cutoff wavelength is 980 nm or less and the absorption coefficient of Er at 1530 nm is 8 dB/m or more.

2. The optical fiber of claim 1 wherein said core further comprises at least one rare earth element among Y, La, Ce, Pr, Nd, Sm, Eu, Gd, Tb, Dy, Ho, Tm, Yb, and Lu co doped with Er.

3. The optical fiber of claim 2 wherein the absorption coefficient of Er is 14 dB/m or more at 1530 nm.

4. The optical fiber of claim 2 wherein the cutoff wavelength is 980 nm or less and the absorption coefficient of Er is 12 dB/m or more at 1530 nm.

5. An optical amplifier comprising the optical fiber (EDF) according to claim 1.

* * * * *